United States Patent [19]

Bossler

[11] Patent Number: 4,623,058

[45] Date of Patent: Nov. 18, 1986

[54] DEVICE FOR ORIENTATION OF CHIPS

[75] Inventor: Friedrich Bossler, Weiterstadt, Fed. Rep. of Germany

[73] Assignee: Carl Schenck AG., Fed. Rep. of Germany

[21] Appl. No.: 668,845

[22] Filed: Nov. 6, 1984

[30] Foreign Application Priority Data

Jan. 26, 1984 [DE] Fed. Rep. of Germany ....... 3402528

[51] Int. Cl.$^4$ .............................................. B65G 47/24

[52] U.S. Cl. ..................................... 198/382; 425/110

[58] Field of Search ............... 198/382, 383, 390, 396, 198/533; 425/81.1, 82.1, 83.1, 110; 222/236, 227, 238

[56] References Cited

U.S. PATENT DOCUMENTS 2,186,652 1/1940 Orth et al. ...................... 198/396 X 4,380,285 4/1983 Burkner et al. ...................... 198/533

4,460,082 7/1984 Burkner .............................. 198/382

*Primary Examiner*—Joseph E. Valenza

*Assistant Examiner*—Lyle Kim

*Attorney, Agent, or Firm*—Connolly and Hutz

[57] ABSTRACT

A device for the orientation of chips into a preferred direction during production of particleboard includes parallel vertical guide surfaces arranged at a distance from one another and horizontal parallel rotating shafts arranged at a distance from one another above the guide surfaces. Each shaft has spacer rings and pin plates that collectively provide pin roller arrangements for the orientation of chips in a preferred direction as the shafts rotate. Chips are discharged without congestion between the guide surfaces and without damage to the pins of the pin rollers. Free passage is also possible for chips to be oriented in the production of OSB boards.

11 Claims, 5 Drawing Figures

DEVICE FOR ORIENTATION OF CHIPS

BACKGROUND OF THE INVENTION

The present invention relates to a device for orienting a mass consisting of wood chips, flakes, slivers and fibers in a preferred direction during the production of particleboard. Vertical guide surfaces are arranged in side-by-side fashion and spaced from one another. Above the guide surfaces, spaced apart horizontal rotating shafts are provided. Spacer rings and pin plates are arranged on the shafts.

A device for the orientation of wood chips and the like during the production of particleboard is known from DE-OS No. 30 18 683. Orientation of chips in a preferred direction is achieved in that above the guide surfaces an assembly of spacer rings, solid plates, and pin plates are arranged on rotating shafts. A device of this nature makes it possible to catch the chips falling onto the rotating shafts, namely by means of the pin plates and to guide these chips into discharge chutes defined by guide plates. This is accomplished by means of the solid plates, which, contrary to the pin plates, have varying diameters. Such an orienting process is difficult in those cases where great wood chip masses pass through the device, since the material to be oriented may enter and accumulate between the pin plates and the solid plates thereby causing a decrease of the passage cross section at the guide plates and blockage. Also it is possible that the pins of the pin plates, due to material falling between the solid plates and pin plates, are bent so far from the solid plates that they touch the edges of the guide plates when the shafts rotate. This may cause the pins to be torn off. Such a tearing may also cause the beginning of a blockage, since the pins of the pin plates no longer can direct the chip material—which partially lies cross-wise over the guide plates—into the chutes between the guide plates. In this case, the solid plates with various diameters are not sufficient to redirect a turned-around chip into a longitudinal orientation.

With the above as background, the purpose of the invention is to guarantee orientation of wood chips and the like to be discharged into a preferred direction, without congestion between the guide plates and without tearing the pins of the pin rollers. This problem is solved by the connection, according to the invention, of all pins with a self-contained closed ring in the same plane as the pins. An open plate arrangement is achieved, whereby the wood chips to be discharged, which are influenced by the pin ends, can also pass through the open plate behind the ring. Thus, there is no additional rotating wall between the individual orientation grids, which wall could cause a congestion in the orientation grid if the flow of chips is heavy, and there is also no danger that the pins are bent away from a plate.

Movement of extremely long chips is accomplished by tipping the chips perpendicularly to the feed direction and accelerating the chips through the pins in the discharge direction.

According to the invention, additional spacer plates, which form a very narrow grid, but due to the openings between the plate hub and the plate ring, it is very easy to achieve that even long pieces can be discharged as small chips through the narrow grids, since they can pass without difficulty through the free space between the plate hub and the plate ring.

Elliptical rings of the pin plates make it possible to cover a major portion of the horizontally arranged pin rollers and thus to decrease problem areas between the individual pin rollers and the guide plates.

The pins extend beyond the elliptical rings to produce a circular path. Also, proper orientation of individual chips is achieved by a variety of pin plate placements on the rotating shafts. When four pins per pin plate are provided, each adjacent plate is oriented 45° in the rotational direction of the shaft. However, according to the invention, it is possible to vary the index angles and the number of pins as desired.

To support the orientation, particularly of long chips, different distances between the upper edges of the vertical guide plates and the horizontal shafts are provided. This will significantly facilitate the turning of chips lying cross-wise to the desired orientation without breaking these chips.

Such devices according to the invention are combined into scatter heads and used in the production of wood material boards with oriented individual chips. For large through-put quantities, several of these scatter heads are arranged in series.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which.

DETAILED DESCRIPTION OF THE INVENTION

Figure 1A:
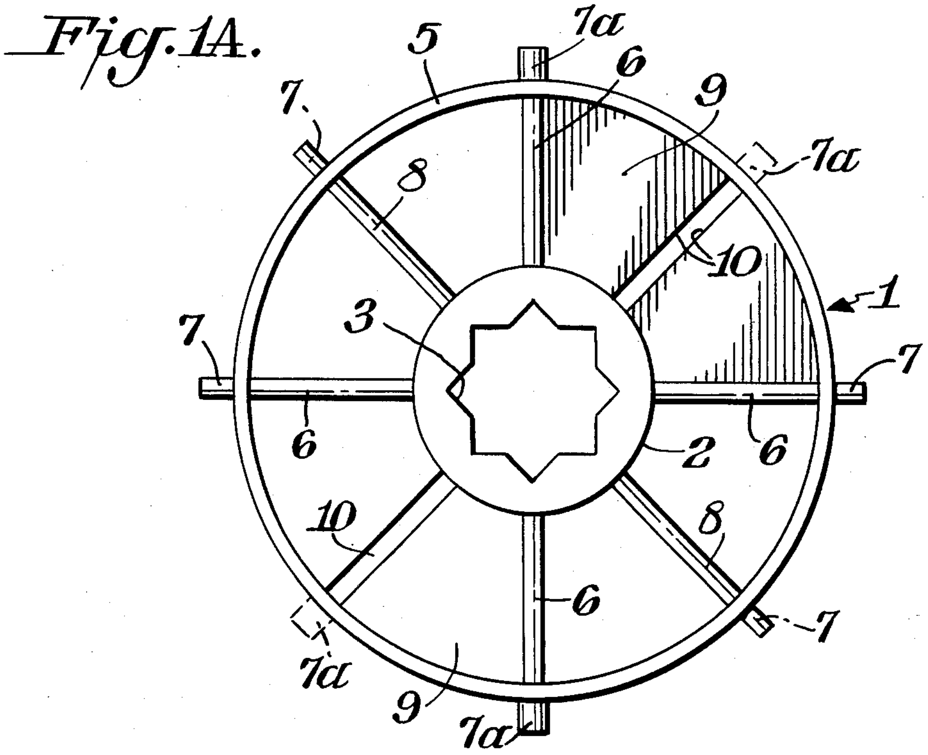
FIG. 1A is a side elevational view of a pin plate with a circular ring, according to the present invention.

Referring in more particularity to the drawing, a pin plate 1 has a hub portion 2, in which there is a star-shaped opening 3. This star-shaped opening serves to slide the pin plat 1 onto a polyhedral shaft 4 (cf. FIG. 2). Due to the star-shaped opening 3, the individual pin plates can be indexed in the axial direction of the polyhedral shaft at arbitrary angles to one another in the rotational direction. As shown in FIG. 1A, a circular ring 5 is positioned near the outside periphery of pin plate 1, and four equally spaced apart ribs 6 radiate from hub 3 to ring 5. If, between the hub portion 2 and the closed ring 5, there are no more than four ribs 6 on which the pins 7, **7*a* are located outside of the ring in the same radial direction, a spiral-shaped arrangement of the ribs 6 and the pins 7, 7*a* may be achieved over the axial length of the polyhedral shaft. Such spiral arrangement occurs if each subsequent pin plate is indexed by 45°, as shown best in FIG. 2B. This spiral-shaped progression of the ribs 6 and the spiral-shaped progression of the pins 7*a*** additionally supports the oriented discharge of the wood chips, as explained more fully below. A device of this nature is preferred in the production of OSB boards (oriented strand board).

The pins 7 comprise extensions of the ribs 6 and have the same dimensions as ribs 6. Pins 7*a* have similar dimensions, but in the circumferential direction, they are wider than the ribs 6. According to the invention, the result of such an execution is that larger chips are also affected by the corresponding impulse and can be oriented into a preferred direction.

From FIG. 1A it can further be seen that auxiliary ribs 8 may be provided between the hub portion 2 and the closed ring 5. These auxiliary ribs 8 serve to stiffen the pin plate 1 and simultaneously to support the orientation of chips. If these auxiliary ribs 8 are extended beyond the closed ring, the result is pin plates with six pins, for example, which in certain cases facilitate the orientation of chips.

Figure 1B:
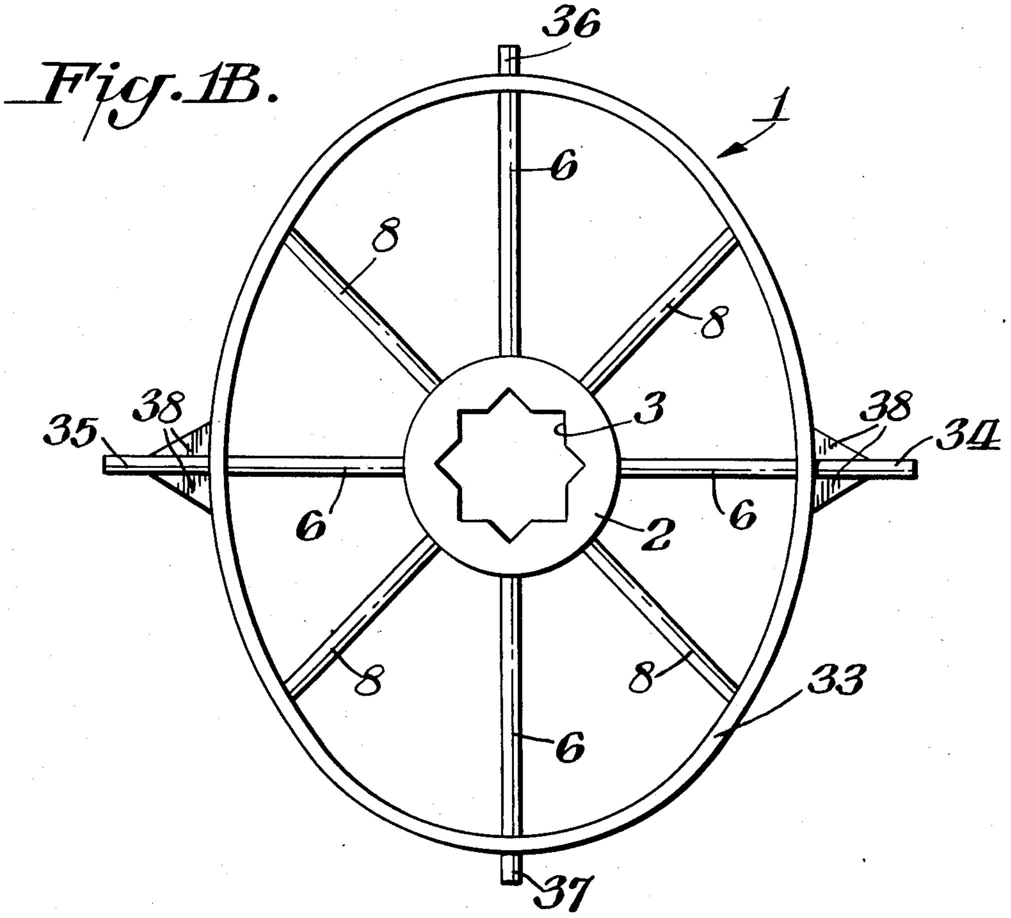
FIG. 1B is a side elevational view of a pin plate with an elliptical ring, according to the present invention.

The star-shaped opening 3 is not fixed to the arrangement represented in FIGS. 1A, 1B, but other star-shaped openings can also be applied, so that a pin plate with eight pins, for example, may be indexed at a specific angle in the circumferential direction from plate to plate so that a spiral-shaped arrangement of the pins 7 and 7*a* and the ribs 6 as well as the auxiliary ribs 8 is possible on the polyhedral shaft with this arrangement of the pin plates. It is also possible to provide the pin plates 1 only with pins 7 or only with pins 7*a* or, as shown, with an arrangement which combines pins 7 and pins 7*a*.

As can further be seen from FIG. 1A, the pin plates 1 may also have individual segments 9, which are limited on one side by edges 10 and on the other hand by ribs 6.

Thus, in the manufacturing of OSB boards, pin plates 1 may be used which consist of ribs 6 and pins 7, a hub portion 2, a star-shaped opening 3 and a closed ring 5, as well as pin plates 1, where, in addition to the ribs 6, there are segments 9 between the hub portion 2 and the closed ring 5. Pin plates 1 may be used which have only segments 9 between the hub portion 2 and the closed ring 5 and in radial direction, in addition to the closed rings 5, pins 7 and pins 7*a*, or only pins 7, or only pins 7*a*. It is also possible to make pin plates 1, in which auxiliary ribs 8 are provided between the hub portion 2 and the closed ring 5 in addition to the ribs 6 or the segments 9.

FIG. 1B shows a pin plate 1, where an elliptical ring 33 encloses the hub portion 2 with the star-shaped opening 3. Auxiliary ribs 8 and ribs 6 extend inside the elliptical ring 33. Rib extensions 34, 35 connect to the ribs 6 outside of the elliptical ring along the minor axis of the ellipse while rib extensions 36, 37 connect to the ribs 6 outside the elliptical ring 33 along the major axis of the ellipse. Rib extensions 34, 35 are dimensioned lengthwise in such a manner that they have the same tip location as rib extensions 36, 37. The radial distance from the center of rotation to the outer tip ends of each extension is the same. In the example of FIG. 1B, the rib extensions 34, 35 are each provided with a reinforcement 38 due to their greater length as compared to the rib extensions 36, 37.

Figure 2A:
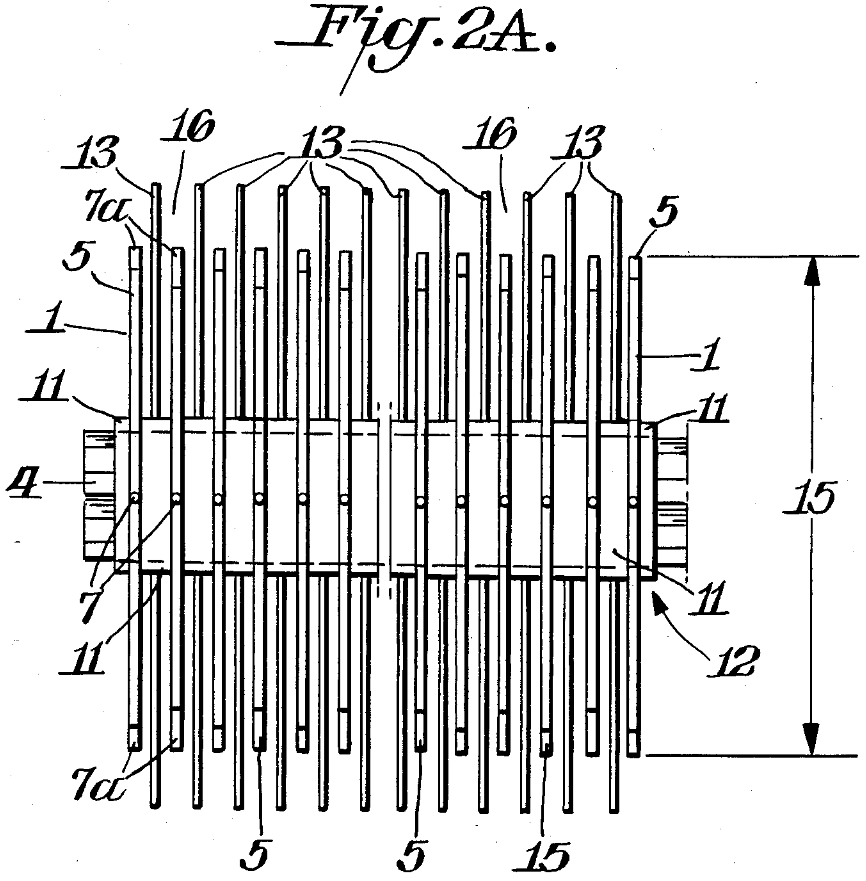
FIG. 2A is a top plan view of a pin roller comprising a combination of several pin plates on one shaft, according to the present invention.

The pin roller shown in FIG. 2A consists of a number of pin plates 1, which are arranged at distances from one another on the polyhedral shaft 4 by means of spacer rings 11. These pin rollers 12 extend over the entire width of the chip material to be produced, so that a continuous wood material, i.e. a material with oriented chips, can be produced. The pin rollers 12 may be associated with vertical guide surfaces 13 located below the rollers and through which the oriented chips are loaded onto a discharge base 14, as shown best in FIGS. 2A and 3.

As can be seen from FIG. 2A, the pin plates 1 have the same movement diameter 15, but the diameters of the closed rings 5 vary. This means that the individual pins 7 or 7*a* extend to different distances beyond the closed ring 5. By means of this relationship of different diameters of the closed rings 5, it is achieved that even long chips assume a specific slide-by angle to the axis of the polyhedral shaft 4 and thus arrive oriented between the individual guide surfaces for deposition onto the discharge base 14.

Basically as a result of the space between the hub portion 2 and the closed ring 5 of the open pin plate 1, the pin plate itself does not constitute a resistance surface which could cause congestion of non-oriented chips and in turn blocking of the chutes 16 between the guide surfaces 13. Due to the sequence of spacer rings 11 and pin plates 1 of the same thickness, the rotating grid of pin plates 1 and consequently of pin rollers 12 can be selected so narrowly that no chip falls on the spacer rings 11 without being oriented. This assures that no chip will be deposited on the discharge base 14 without first being properly oriented.

Figure 2B:
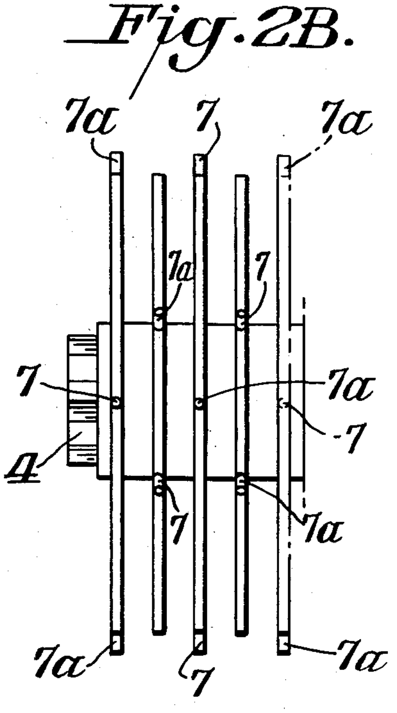
FIG. 2B is a top plan view similar to FIG. 2A illustrating another pin roller arrangement.

FIG. 2B illustrates the arrangement of pin plates 1, each having only four ribs 6, and indexed on the shaft 4 so that each plate is offset from an adjacent plate by 45°. This produces an outside spiral or helical pattern of pins 7 and 7*a*. Otherwise the arrangements of FIGS. 2A and 2B are the same.

Figure 3:
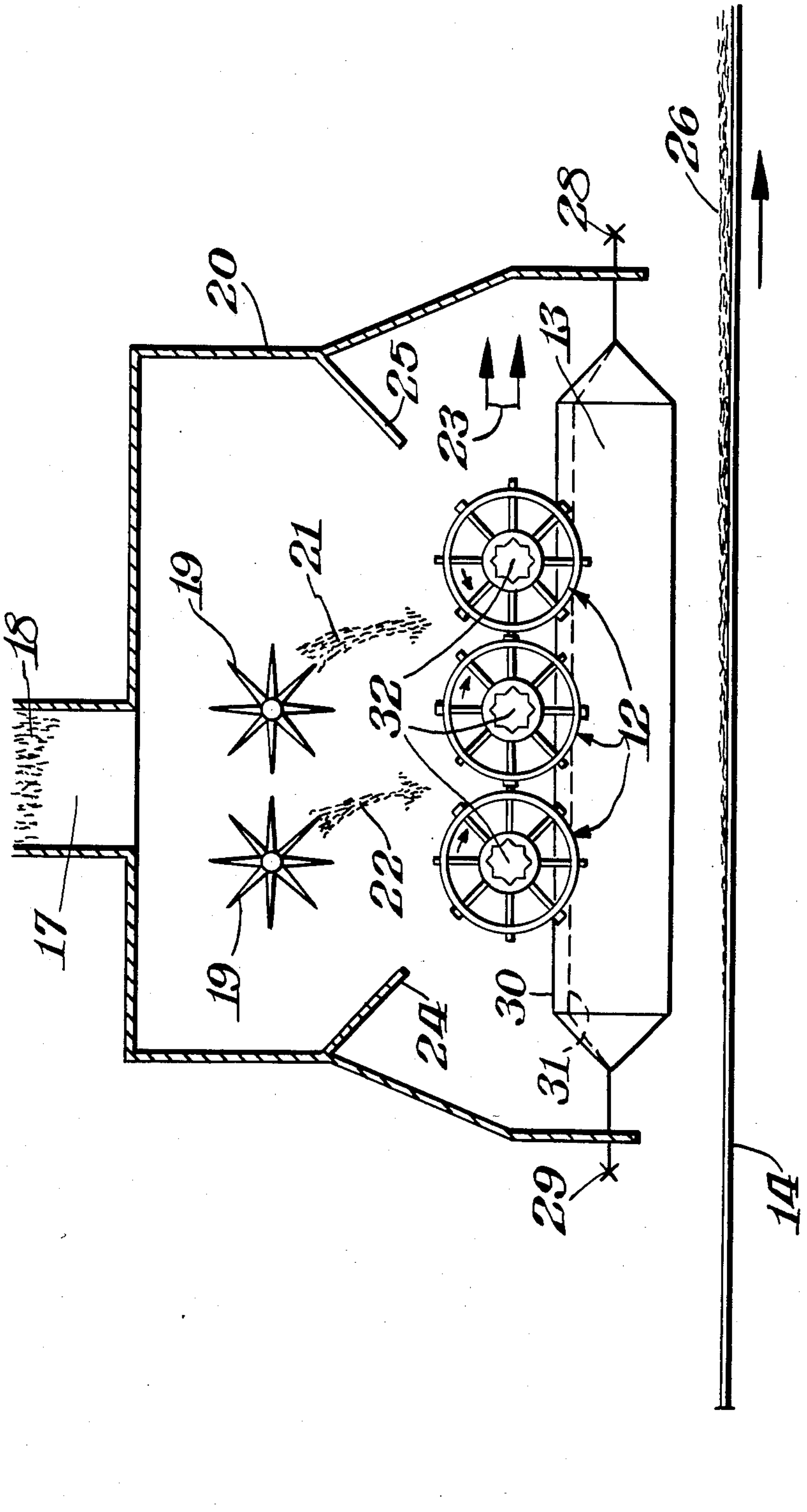
FIG. 3 is a side elevational schematic view of a chip orientation device, according to the present invention.

The orientation device shown in FIG. 3 is fed with material to be oriented, namely via an opening 17. This material has previously been broken up by means of preliminary break-up rollers 19 which are located in a housing 20. The orientation device extends over the entire width of the discharge base 14 and in the direction of arrows 21, 22, the not yet oriented material is fed to pin rollers 12 consisting of pin plates 1 and spacer rings 11 on polyhedral shafts. The pin rollers 12 also rest on left and right bearings (not shown) positioned in the housing 20 and extend over the entire width of the discharge base. As shown in FIG. 3, two pin rollers 12 rotate clockwise, while one pin roller 12 rotates counterclockwise. The purpose is that the pre-broken chip material coming from the breaking rollers 12 is transported and oriented through the guide surfaces 13 expressly by means of the pin rollers 12. Thus, chip material which has not been oriented cannot fall onto the guide surfaces 13 behind the last pin roller 12, as shown by the double arrow 23, where it could cause congestion.

The guide surfaces 13 have upper edges 30, 31, whereby the upper edge 31 has a greater distance to the axes 32 of the pin rollers 12 than the upper edge 30. The lower edges of the guide surfaces 13 are not displaced in respect to one another.

According to the invention, the outermost guide surfaces 13 have upper edges 30, while the guide surfaces 13 arranged between these entry surfaces have alternatingly upper edges 30 and 31, i.e. different distances to the axes 32.

Limit flaps 24, 25 additionally screen the area above the pin rollers 12 so that the pre-broken chip material 21, 22 is transported through the chutes 16 between the guide surfaces 13 in the area of the pin rollers. After leaving the guide surfaces 13, the oriented chip material is deposed as a mat of wood material 26 onto a discharge base 14.

The guide surfaces 13 are connected with the housing 20 of the orientation device by means of screw connections 28 and 29. The different distances of the upper edges of the guide surfaces 13 in itself facilitates a tipping of extremely long chips into the individual chutes. In addition, and in combination with the pin rollers 12, it facilitates the discharge of chip material to be oriented.

What is claimed:

1. A device for the orientation of chips in a preferred direction during the production of particleboard by means of parallel, vertical guide surfaces arranged at a distance from one another and rotating shafts arranged parallel and at a distance from one another, above the guide surfaces, and spacer rings and pin plates connected to rotate with the shafts, the improvement according to which each pin plate on the shafts includes a hub, a closed ring outwardly of the hub, a plurality of spaced apart radially extending ribs interconnecting the hub and the closed ring, and spaced apart pins connected to the ring extending radially outwardly thereof, the pins lying in the same plane as the ring and hub, and a tip end of each pin being equally spaced from the center of the hub.

2. The combination of claim 1 in which the closed rings of the pin plates have varying diameters.

3. The combination of claim 1 in which pin plates with large ring diameters are spaced from one another on the shaft, and at least one pin plate with a lesser ring diameter is located therebetween.

4. The combination of claim 1 in which the closed rings of the pin plates have an elliptical shape.

5. The combination of claim 4 in which the pin plates with elliptical rings are displaced 90° in relation to one another on the shaft.

6. The combination of claim 4 in which the pins extending radially outward of the elliptical rings have varying lengths but the tip end of each pin is equally spaced from the center of the hub.

7. The combination of claim 1 including planar ring segments extending between the hub and ring of selected pin plates.

8. The combination of claim 1 in which the pins of adjacent pin plates on the shaft are displaced with respect to one another.

9. The combination of claim 1 in which each pin plate includes four pins and adjacent pin plates are oriented 45° from one another on the shaft.

10. The combination of claim 1 in which at least some of the pins have a greater thickness.

11. The combination of claim 1 in which the upper edges of the vertical guide surfaces arranged side by side are spaced different distances from the horizontal axes of the shafts.

* * * * *